(12) United States Patent
    Cook

(10) Patent No.: US 8,570,715 B2
(45) Date of Patent: Oct. 29, 2013

(54) LOAD CENTER WITH BRANCH-LEVEL CURRENT SENSORS INTEGRATED INTO POWER BUSES ON A UNIT WITH ON-BOARD CIRCUIT BREAKER MOUNTS

(76) Inventor: Darcy Cook, Winnipeg (CA)

( * ) Notice: Subject to any disclaimer, the term of this patent is extended or adjusted under 35 U.S.C. 154(b) by 259 days.

(21) Appl. No.: 13/165,068

(22) Filed: Jun. 21, 2011

(65) Prior Publication Data
    US 2012/0327563 A1    Dec. 27, 2012

(51) Int. Cl.
    *H02B 1/26*    (2006.01)
    *H01R 9/00*    (2006.01)

(52) U.S. Cl.
    USPC ............................ 361/624; 361/772; 361/775

(58) Field of Classification Search
    None
    See application file for complete search history.

(56) References Cited

U.S. PATENT DOCUMENTS

| | | | |
|---|---|---|---|
| 4,553,115 A | 11/1985 | Grunert et al. | |
| 4,642,726 A | 2/1987 | Matsko et al. | |
| 4,654,614 A | 3/1987 | Chien et al. | |
| 4,887,057 A | 12/1989 | Gula et al. | |
| 5,200,724 A | 4/1993 | Gula et al. | |
| 5,341,191 A | 8/1994 | Crookston et al. | |
| 5,742,005 A * | 4/1998 | Saka et al. | 174/541 |
| 5,861,683 A | 1/1999 | Engel et al. | |
| 6,086,388 A * | 7/2000 | Sloey et al. | 439/110 |
| 6,310,293 B1 * | 10/2001 | Kawakita | 174/99 B |
| 6,606,251 B1 * | 8/2003 | Kenny et al. | 361/764 |
| 6,693,370 B2 * | 2/2004 | Yamane et al. | 307/10.1 |
| 6,843,335 B2 * | 1/2005 | Shirakawa et al. | 180/65.1 |
| 6,885,553 B2 * | 4/2005 | Pfeifer et al. | 361/688 |
| 7,133,921 B2 * | 11/2006 | Nasman et al. | 709/230 |
| 7,269,019 B2 * | 9/2007 | Hirata et al. | 361/719 |
| 7,468,883 B2 * | 12/2008 | Mann | 361/641 |
| 7,518,882 B2 * | 4/2009 | Shimizu et al. | 361/775 |
| 8,284,563 B2 * | 10/2012 | Hosokawa et al. | 361/775 |
| 2009/0018706 A1 | 1/2009 | Wittner | |

* cited by examiner

*Primary Examiner* — Boris Chervinsky
(74) *Attorney, Agent, or Firm* — Kyle R. Satterthwaite; Ryan W. Dupuis; Ade & Company Inc.

(57) ABSTRACT

A load center comprising a housing and, mounted within the housing as a single pre-fabricated unit of interconnected elements, two power buses, conductive paths branching off from each power bus, respective branch circuit breaker mounting sites each conductively linked to a corresponding one of the two power buses by a respective one of the conductive paths, and current sensors each association with a respective one of the conductive paths branching off from the power buses to provide an output responsive to current passing through said respective conductive path from the corresponding one of the two power buses to the respective branch circuit breaker mounting site. A processor in the housing receives current level signals indicative of the current passing through the conductive paths to produce, and preferably transmit, data for consideration in terms of power consumption by branch circuits fed through the load center.

13 Claims, 8 Drawing Sheets

LOAD CENTER WITH BRANCH-LEVEL CURRENT SENSORS INTEGRATED INTO POWER BUSES ON A UNIT WITH ON-BOARD CIRCUIT BREAKER MOUNTS

FIELD OF THE INVENTION

This invention is directed generally to the real-time remote monitoring of loads powered by a load center, and more particularly to a load center design that incorporates power buses, branch-level circuit breaker mounts and pre-breaker, branch-level current sensors into a single unit.

BACKGROUND OF THE INVENTION

Power lines for an industrial, residential, or commercial building are provided through an electrical service entrance which is generally connected to a load center with a main circuit breaker. After passing through the main circuit breaker, the power lines are connected to a bus bar. A bus bar consists of electrical conductors (i.e. metal bars), one for each voltage to be distributed to branch circuits, with features that allow individual branch circuit breakers to make an electrical connection to the bus bar. Several branch circuit breakers are then connected to a bus bar to provide power to loads. Circuit breakers are well known in the art. Examples of circuit breakers are given in U.S. Pat. Nos. 4,553,115; 4,642,726; 4,654,614; 4,887,057; 5,200,724; and 5,341,191. Typically a load center contains many branch circuit breakers that can switch power to the loads on the respective branch circuits. Loads that are common in location within a building or common in their function are typically grouped together on a branch circuit that can be switched by a single circuit breaker.

An energy meter is part of the electrical service entrance to allow for the electrical service provider to measure kWh for the purposes of billing. Users of the electricity are typically billed monthly for the previous month's electricity use. However, with the increasing number of electrical appliances and devices in a household, business, or industrial plant, it is difficult for users to know what appliances and devices are large users of electricity, thereby making it difficult to know what changes should be made to reduce electricity use. Users interested in reducing energy use would benefit from both viewing real-time energy usage, and from viewing a more detailed breakdown of energy usage to be able to identify the appliances and devices that are the most significant energy users.

An example of a load center where the individual branch circuits are monitored for the purpose of controlling remotely controllable circuit breakers is disclosed in U.S. Pat. No. 5,861,683. In this patent the branch circuits are monitored for the purpose of providing information on controlling remotely controllable circuit breakers locally using a power line carrier communication method (specifically the X10 communication protocol is used). The limitation of the power line carrier communication method is that the power information cannot be viewed in a location far removed from the building. This means that users cannot view real-time energy usage when they are away from the building using the energy. Remote access to real-time energy information at the branch circuit level would allow users to monitor power at any time of day from any location in the world. There is a need, therefore, for users to view real-time power or energy usage of individual branch circuits from a remote location, rather than only total building energy usage in time increments of a month from a fixed location.

U.S. Pat. No. 5,861,683 suggests the use of current sensors on branch circuits on the opposite side of the circuit breaker from the main power connection. A typical circuit breaker panel consists of a bus bar that distributes power to individual branch circuits. The branch circuit breakers have a wire attached connected on the opposite side of the circuit breaker from the bus bar connection. This means that connecting a current sensor to the opposite side of the circuit breaker from the bus bar means that the current sensor must be added in series with a wire, or around a wire (depending on the type of current sensor). In either case, this is a deviation in the standard installation procedure used for commonly installing branch circuit breakers, which can add awkwardness the installation procedure. The side of the circuit breakers on which the current sensors are installed does not make a difference to the function of the current monitoring, however, it does make a difference to the implementation in terms of size and cost. Embedding the current sensor in the bus bar allows for a conventional breaker can be connected to the bus bar without any difference in the installation procedure. This would allow for a lower cost and more compact solution compared to a current solution where the current sensor is on the opposite side of the circuit breaker from the bus bar. Therefore, there is need for an improved apparatus for monitoring branch circuit power or energy by integrating the branch current sensors into the power bus bar to result in a compact and low cost method for monitoring power or energy in branch circuits.

Computerized Electricity Systems Inc., assignee of U.S. Patent Application Publication No. 2009/0018706, has developed a load center that employs "smart switches" that are installed in front of conventional branch-level breakers to control electricity consumption by branch circuits. The switches include current sensors measuring the current through the breakers, and the system transmits data via the internet to offer remote monitoring possibilities. In the load center referenced on the company's website, the control functionality of the system results in a module of smart switches that occupies a substantially portion of the load center housing, leaving room for only a single-row bank of circuit breakers mounted separately from the smart switch module.

The applicant of the present application has developed a unique load center that incorporates branch circuit current sensing and remote monitoring functionality in a more compact, simplified design satisfying the needs identified above, as well as several others.

SUMMARY OF THE INVENTION

According to a first aspect of the invention there is provided a load center comprising:
  a circuit board;
  two power buses carried on the circuit board and each arranged for conductive connection to a respective one of two incoming power lines intended to feed the load center;
  conductive paths branching away from each power bus in conductive connection therewith;
  respective branch circuit breaker mounting sites defined on the circuit board and each conductively linked to a corresponding one of the two power buses by a respective one of the conductive paths, each branch circuit breaker mounting site being arranged to engagingly receive a branch circuit breaker in a position placing said circuit breaker in electrically conductive connection with the respective conductive path; and
  current sensors mounted on the circuit board, each in association with a respective one of the conductive paths branching off from the power buses to provide an output responsive to current passing through said respective conductive path from the corresponding one of the two power buses to the respective branch circuit breaker mounting site.

Preferably a processor is mounted on the circuit board in communication with the current sensors to receive current level signals indicative of the current passing through the conductive paths.

Preferably a communication interface is located on the circuit board and linked with the processor to transmit data from the processor to remote locations external to the load center.

Preferably the conductive paths comprise conductive branch traces on the circuit board between the power buses and the branch circuit breaker mounting sites.

Preferably the current sensors comprise integrated circuit current sensors mounted on the circuit board in conductive connection between the power buses and the conductive branch traces.

Each power bus may comprise a respective power bus trace on the circuit board.

Preferably there is provided a main circuit breaker mounting site on the circuit board, said main circuit breaker mounting site being arranged to engagingly receive a main circuit breaker in a position placing contacts of said circuit breaker in electrically conductive connection with the power buses.

Preferably there is provided a voltage sensor arranged to produce output responsive to a voltage level between the two incoming power lines to provide voltage level signals indicative of said voltage level to the processor.

There may be provided multiple layers of conductive traces on the circuit board within a layout of the power buses and the conductive paths on said circuit board. In such instances, the conductive branch traces may include traces on opposing sides of the circuit board.

In one embodiment, the branch circuit breaker mounting sites are arranged in rows comprising two circuit breakers each, the two circuit breakers of each row connecting to a same one of the two power buses via branch traces found among different layers on the circuit board. In such an embodiment, the branch circuit breaker mounting sites may all be arranged to engage the branch circuit breakers on a same side of the circuit board, the respective conductive path of one circuit breaker in each row comprising a conductive trace extending along said row on the same side of the circuit board as on which the branch circuit breaker mounting sites are arranged to engage the branch circuit breakers, and the respective conductive path of the other circuit breaker in each row comprising another conductive trace extending along said row in a different layer of the circuit board.

There may be provided a neutral bus carried on the circuit board and arranged for coupling thereof to an incoming neutral line associated with the two incoming power lines, and for connection to the neutral bus of branch circuit conductors found in branch circuits on sides of branch circuit loads opposite the circuit breakers. Likewise a ground bus bar could be provided on the circuit board, but alternatively neutral and ground bus bars may be provided elsewhere in the load center, for example in the form of conventional neutral and ground bus bars mounted on an interior wall of a load center housing or enclosure in a conventional manner.

According to a second aspect of the invention there is provided a load center comprising a housing and, mounted within the housing as a single pre-fabricated unit of interconnected elements, two power buses, conductive paths branching away from each power bus in conductive connection therewith, respective branch circuit breaker mounting sites each conductively linked to a corresponding one of the two power buses by a respective one of the conductive paths, and current sensors each association with a respective one of the conductive paths branching off from the power buses to provide an output responsive to current passing through said respective conductive path between the corresponding one of the two power buses and the respective branch circuit breaker mounting site.

Preferably the pre-fabricated unit comprises a carrier mounted to the housing, and wherein the power buses, conductive paths, branch circuit breaker mounting sites, and current sensors are all carried on the carrier.

Preferably the carrier comprises a single circuit board on which the power buses, conductive paths, branch circuit breaker mounting sites, and current sensors are all carried.

BRIEF DESCRIPTION OF THE DRAWINGS

In the accompanying drawings, which illustrate a exemplary embodiments of the present invention.

DETAILED DESCRIPTION

The present application describes a load center for monitoring the power or energy of individual loads switched by circuit breakers and communicating the power or energy remotely over a communication network, such as the Internet. The load center includes a housing; a plurality of circuit breakers housed by the housing; a power bus bar with integrated current sensors for individual circuits housed by the housing; a load center processor housed by the housing; non-volatile memory for storing historical power or energy information; and a communication port connecting the load center processor to a communication network. The circuit breakers, which switch a current from the current breaker to the load, are common circuit breakers well known in the art that are connected to a bus bar housed within the load center housing, which includes integrated current sensors for each individual circuit switched by a circuit breaker. The current sensor outputs are measured by the load center processor, along with the voltage supplied to each of the circuits. The load center processor calculates the power or energy for each individual circuit and communicates this information over a communication network, to allow users to remotely view real-time power or energy use of individual circuits.

Figure 1:
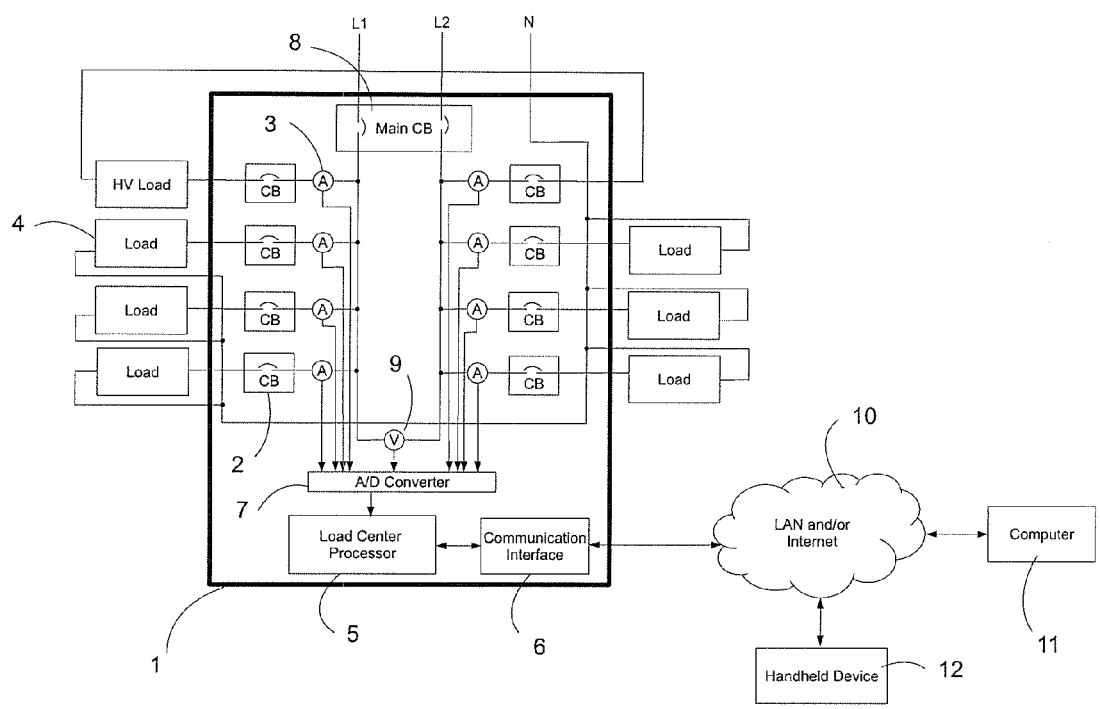
FIG. 1 is a block diagram of a load center of the present invention.

A load center of the present invention allows for remotely monitoring branch circuit power or energy with current sensors integrated into the power bus bar. A block diagram of the load center is shown in FIG. 1. The load center features a housing (1) that accepts conventional circuit breakers (2), but with the addition of an array of current sensors (3), a load center processor (5), and a communication interface (6). The current sensors output a voltage relative to the current of the branch circuit loads (4). The sensor output voltage is measured by an analog to digital converter (7) to convert the voltage to a digital value that can be read by the load center processor.

Typical residential and commercial buildings feature a 3-wire service where main power provided from the metered service entrance consists of two power lines (labeled L1 and L2 in FIG. 1) and a neutral line (labeled N in FIG. 1). L1 and L2 are connected to a main circuit breaker (8), which then connects each of these to the load center bus bar. The illustrated load centers of the present invention are designed for use in such typical 3-wire service applications.

The voltage provided to each of the branch circuits through the main circuit breaker (8) is measured with an isolated voltage measure circuit (9) that outputs a voltage relative to the mains voltage, which is interface to the analog to digital converter (7). The load center processor reads the digital representation of the mains voltage and the digital representation of each of the branch circuit currents. With this information that load center processor can calculate the power consumption or energy usage of each of the branch circuit loads. This information can be transmitted using the communication interface (6) over a communication network (10) to be viewed by users at remote locations using a common computer (11) or handheld device (12). The power or energy information can be displayed to the user in many different formats. For example, the information can be displayed such that a user can view loading profiles over a selected period of time, or, with the additional information of the utility electricity rates, the user can calculate the real-time costs associated with the power or energy usage of devices on each branch circuit. This information can be used to improve power efficiency by determining the devices that use the largest amount of energy, or the information can be used to determine if a branch circuit is too heavily loaded.

Figure 2:
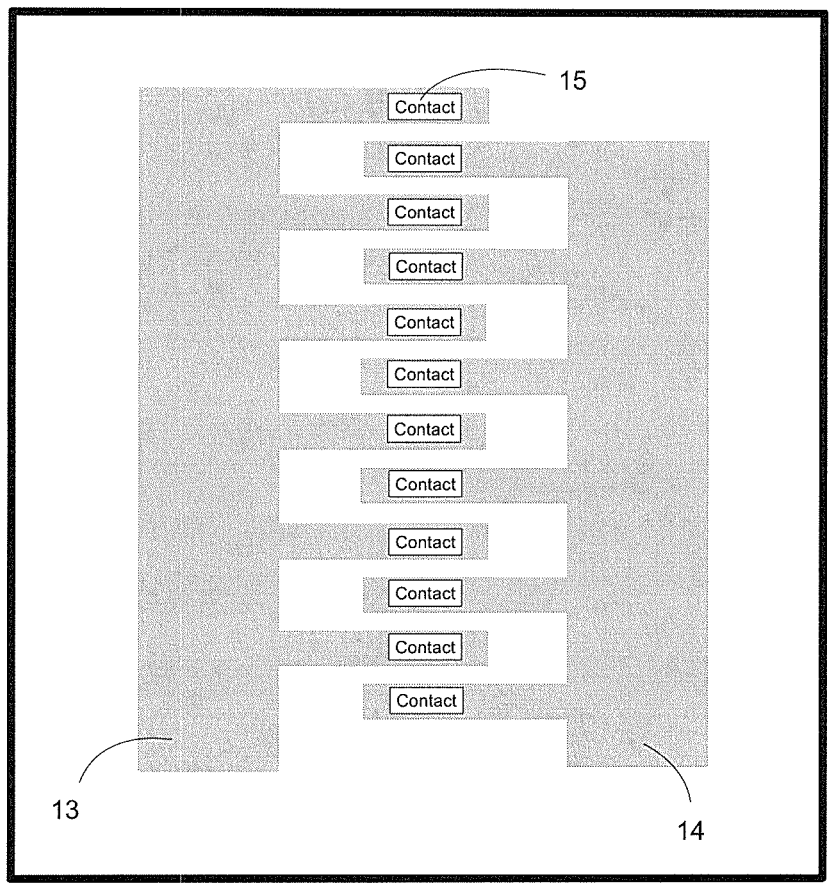
FIG. 2 is a schematic illustration of a bus bar layout out of a conventional load center.

A notable difference between this invention and other power monitoring products are that the current sensors are integrated circuit (IC) components mounted on a printed wiring board or printed circuit board (PCB) that also has the main power bus bars carried or defined thereon. A conventional circuit breaker panel has power bus bars that are used to distribute the mains voltage to each of the branch circuit breakers. FIG. 2 shows the configuration of a conventional load center bus bar. The bus bars consist primarily of two electrically conductive pieces (13) (14) each with contact features (15) that allow circuit breakers to make an electrical connection to the bus bar on one side of the breaker. The other side of the breaker is configured to accept the end of a wire conductor that runs out to a load as part of a branch circuit. Voltage is connected to each bus bar through the main circuit breaker. In typical North American residential power systems there is a voltage difference between the two conductive pieces or bars of about 240 VAC. The contact features (15) differ between various load centers according to the type of circuit breakers intended to be connected to the bus bar.

Figure 3:
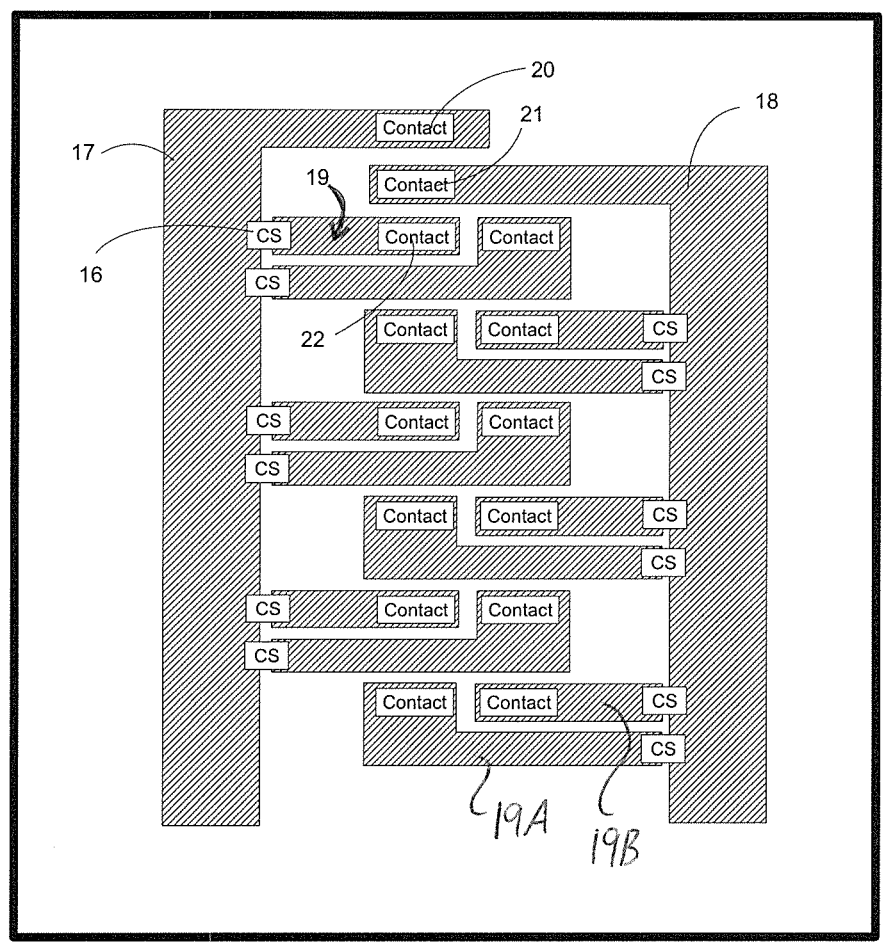
FIG. 3 is a schematic illustration of a layout of bus bars and circuit breaker mounting sites in a single-sided printed circuit board of a first embodiment load center of the present invention.

The present invention features a bus bar configuration that has integrated current sensors. FIG. 3 shows one possible implementation of a bus bar layout with integrated current sensors. The mains voltage is connected to large electrically conductive copper traces (17)(18) on a printed wiring board through the main circuit breaker connections (20)(21). The large traces 17, 18 are each of inverted L-shape with their horizontal legs extending toward one another at their upper ends, one leg over the other to position the main breaker connections 20, 21 one over the other in alignment with each other so as to fit the contacts of a conventional main breaker. Between the vertical legs of the large traces 17, 18, smaller branch traces 19 extend laterally from adjacent each large trace toward the opposing large trace at vertically spaced locations along these large traces. The branch traces 19 of each large trace are arranged in exclusive pairs that jut outwardly away from the large trace in a parallel direction, with one of the branch traces 19A of the pair being longer than the other 19B, and also being L-shaped to position the distal end of that branch trace past the end of the other branch trace in alignment therewith. Moving vertically along the large traces, the pairs of branch traces 19 alternate between which of the large traces they extend from. Adjacent the distal end of each branch trace, a branch circuit breaker connection 20 is mounted to the printed wiring board in conductive contact with that branch trace. The vertical legs of the longer, wider traces 17, 18 thus cooperate with the shorter narrower traces 19 to resemble a conventional bus bar arrangement of two bus bars with vertically running spine or trunk like sections and horizontally jutting branches, fingers, legs or stabs, each presenting two connection sites for two breakers side by side in a two-breaker row.

The circuit breaker connections (20)(21)(22) are metal components mounted to the printed circuit board in conductive contact with respective traces, and that have features to allow conventional circuit breakers to plug directly onto the circuit breaker connections, thereby each making a direct electrical connection between the respective bus bar trace and the circuit breaker's bus-bar contact. As mentioned above, many styles or designs of breaker/busbar contact arrangements are known in the art, and so different types of breaker contacts may be employed within the scope of the present invention to form breaker mounting sites at which breakers are receivable in a manner engaging them into conductive connection with the branch traces of the busbar layout. In addition to the actual conductive contact for establishing electrical connection of the breaker's bus-bar contact with a respective branch trace, the mounting sites may employ additional retention features, for example positioned over or laterally outward from the main bus bar traces 17, 18, for the circuit breaker housings to clip, snap, hook, screw or otherwise fasten onto the board in a position establishing the electrical connection of the breaker to the bus bar.

Figure 4:
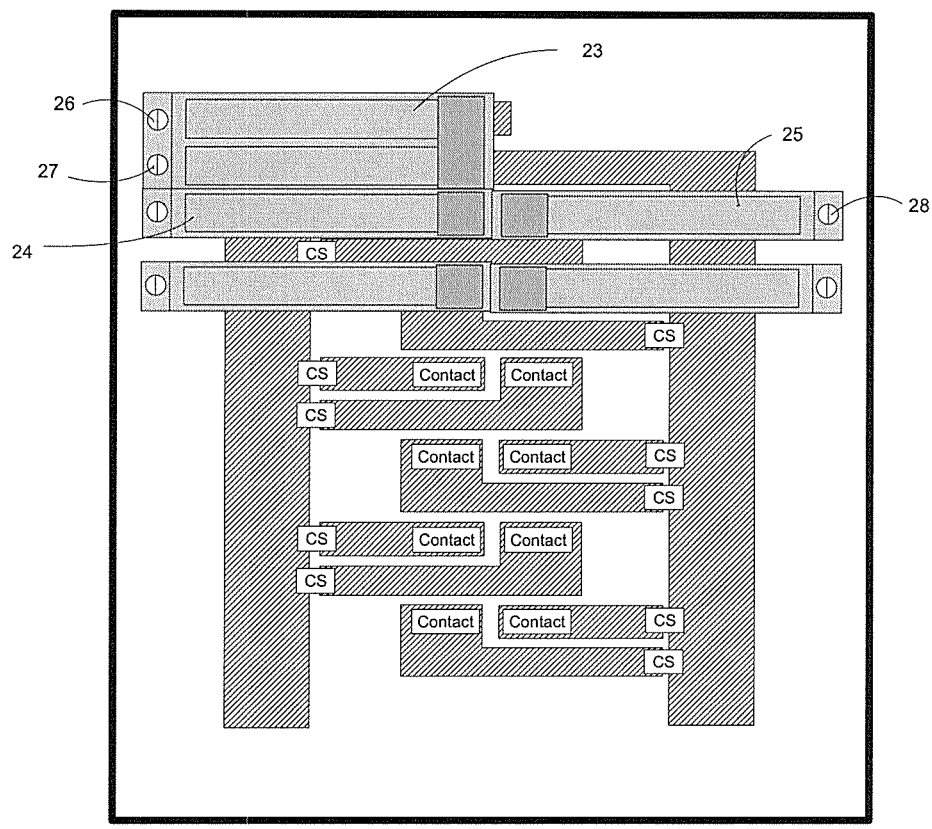
FIG. 4 is a schematic illustration demonstrating installation of circuit breakers in the first embodiment load center layout of FIG. 3.

A board mount current sensor (16) is connected between the main voltage connections (larger traces 17, 18) and each smaller individual printed wiring board branch trace (19), which is then connected to branch circuit breaker through the respective circuit breaker contact (22). The current sensors provide a voltage output relative to the current through the branch circuits, where the output voltage is electrically isolated from the branch circuit voltage. FIG. 4 shows the main circuit breaker (23) and several branch circuit breakers (24) (25) installed into conductive contact with the bus bar traces having the integrated current sensors from FIG. 3. In a conventional manner, the main circuit breaker has screws (26)

(27) for the connection of the mains voltage lines L1 and L2 (as labeled in FIG. 1). The wire for the L1 voltage is connected to one screw (26) and the wire for the L2 voltage is connected to the other screw (27). Also in a conventional manner, a wire connecting to a branch circuit load is connected to a screw (28) on the branch circuit breaker (25).

Figure 5A:
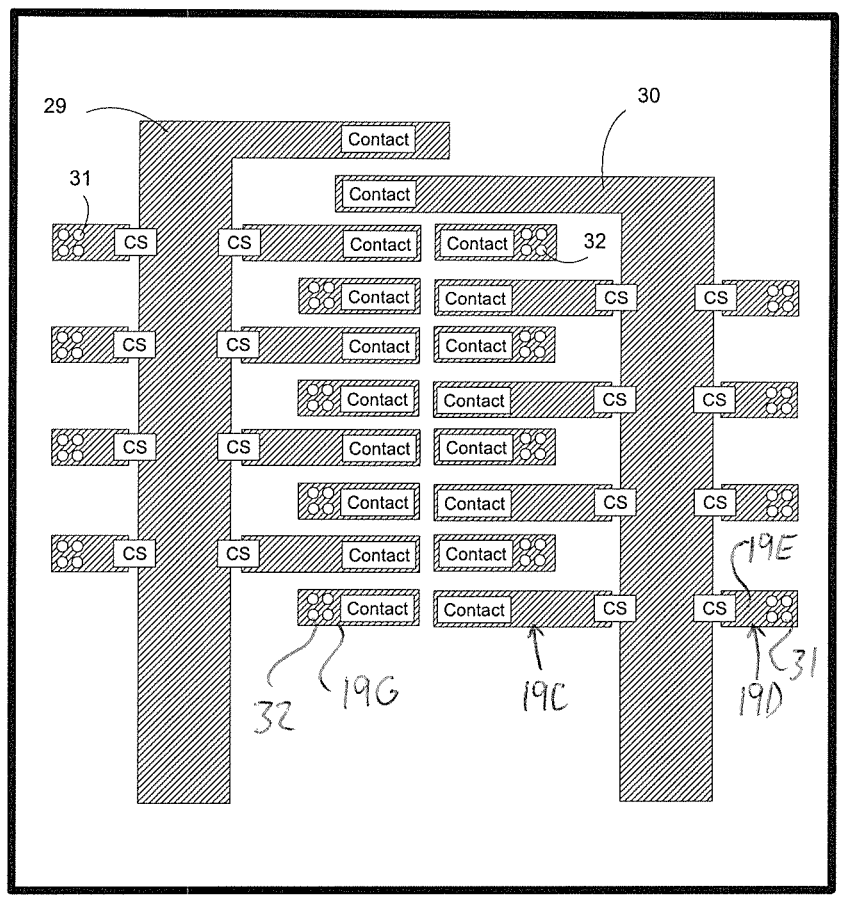
FIGS. 5A and 5B are schematic illustrations of front and rear sides, respectively, of a double-sided printed circuit board of a second embodiment load center of the present invention.
Figure 5B:
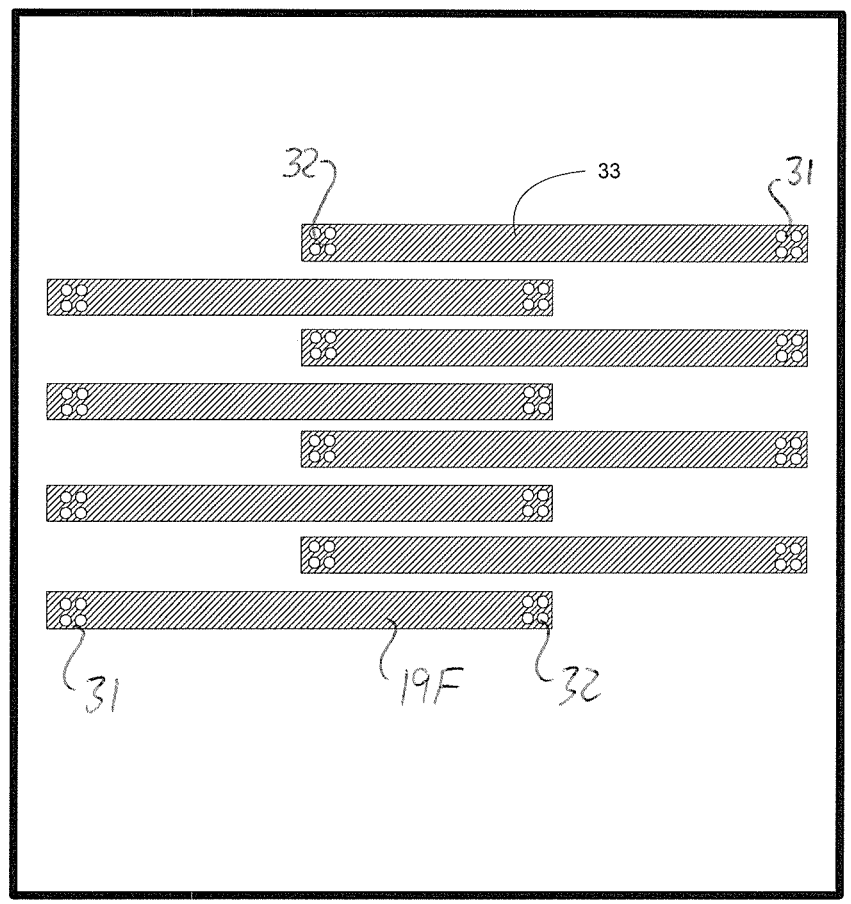

FIG. 5A and FIG. 5B show another possible implementation of a bus bar with integrated current sensors. In this configuration the printed wiring board is a two layer or double sided board where vias 31, 32 are used to connect traces on one side of the board to the other. FIG. 5A shows the top side of the printed wiring board and FIG. 5B shows the bottom side of the board. Similar to the configuration of FIG. 3, the mains voltage is connected to large copper traces (29)(30) of inverted L-shape on the front side of the printed wiring board for distribution to each of the branch circuit breakers connected to smaller branch traces linked to the larger traces by current sensors mounted on the board. In this configuration vias (31)(32) in the printed wiring board are used to connect a copper trace from one side of the printed wiring board to the other with a trace on the back side of the board (33).

More particularly, unlike the first embodiment where the two branch traces of each pair are disposed one above the other along the vertical leg of the respective larger trace, the two branches 19C, 19D of each pair of traces defining a two-breaker row of circuit breaker mounting sites instead initially jut outward from the larger trace to opposite sides thereof at the same position therealong. The branch 19C jutting inwardly (i.e. toward the opposing larger trace) consists of a single trace extending from the current sensor 16 that connects the branch 19C to the larger trace to the respective circuit breaker contact 22. However, the other branch 19D includes three traces: a first trace 19E jutting outwardly away from the larger trace on the front of the circuit board, a second trace 19F on the rear side of the circuit board running from the outer end of the first trace 19E past the inner end of the other branch 19C, and a third trace 19G on the front side of the board running from the inner end of the second trace 19F back toward the circuit breaker contact of the other branch 19C. A first set of vias 31 connect the first trace 19E to the second trace 19F, and a second set of vias 32 connect the second trace 19F to the third trace 19G.

Figure 6:
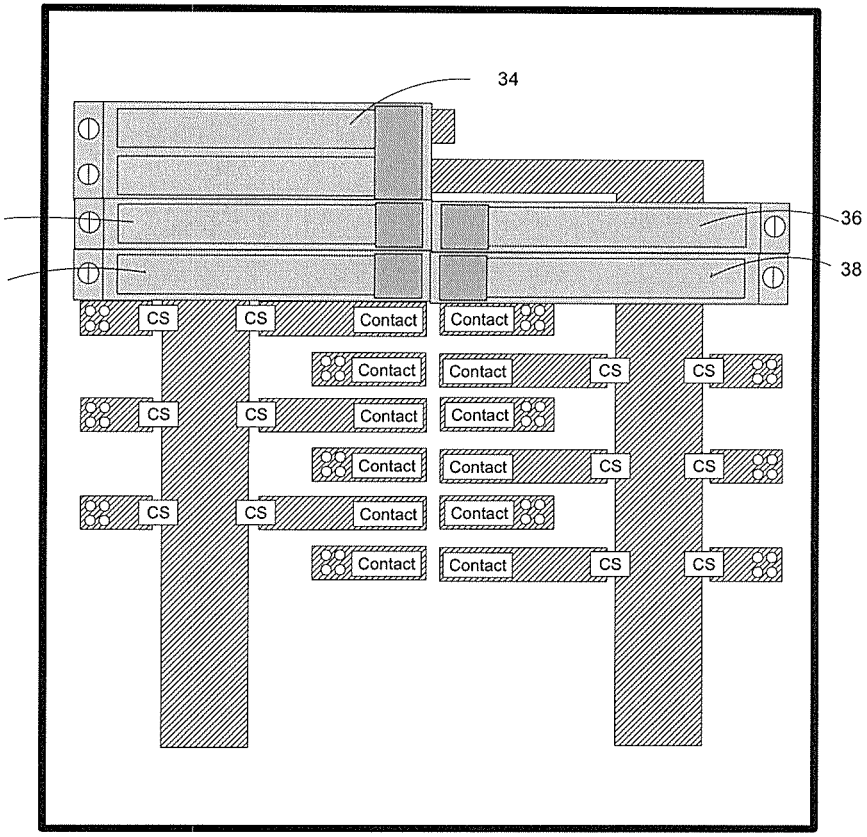
FIG. 6 is a schematic illustration demonstrating installation of circuit breakers on the front side of the second embodiment load center circuit board of FIG. 5.

This way, both branches can occupy the same surface area of the printed circuit board by using opposing sides thereof to form two different layers of conductive tracing. If the branch traces of the circuit board need to be wider than the housing thickness of the circuit breakers the contacts 22 are designed to accommodate, then this configuration has the advantage over the configuration in FIG. 3 terms of minimizing space between the circuit breakers of adjacent rows, thereby increasing the compactness of the overall collection of installed branch circuit breakers. FIG. 6 shows the main circuit breaker (34) and several branch circuit breakers (35)(36) (37) (38) installed in the bus bar with integrated current sensors from FIG. 5A.

Figure 7:
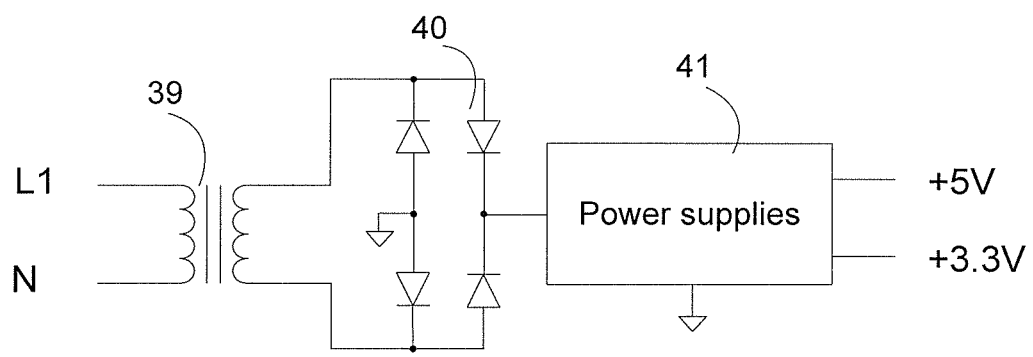
FIG. 7 is a schematic diagram of a front end power supply for a processor of the load center of the present invention.

Low voltage DC supplies are required to power the electronics required for the load center processor, the A/D converter, voltage and current measuring interfacing circuitry, and the communication interface. FIG. 7 shows a possible implementation of the front end power supply used for the load center electronics. A transformer (39) is used for electrical isolation between the low voltage electronics power supply and the mains voltage, and to step down the mains voltage to a lower voltage that could be input into DC to DC voltage regulators. A full-wave rectifier (40) is used on the front end of the power supply, which would be used in conjunction with input capacitance to convert the AC voltage output of the transformer to a DC voltage. The electronics power supplies (41) would contain several voltage regulators, that may be switch-mode buck-type voltage regulators or linear regulators, depending on the current and voltage needs of the electronics. FIG. 7 shows output voltages of +5 Volts and +3.3 Volts, which are typical voltage rails used for electronics, but these may differ on depending on the specific needs of the electronics to be powered.

Figure 8:
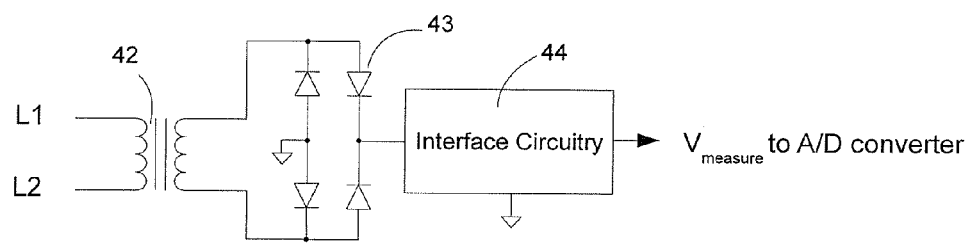
FIG. 8 is a schematic diagram of a voltage measurement circuit of the load center of the present invention.
Figure 10:
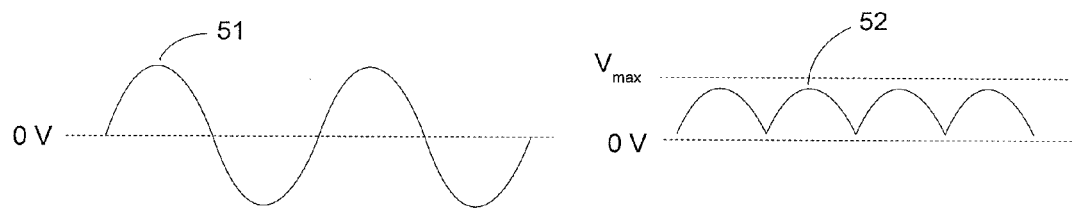
FIG. 10 illustrates input and output voltage waveforms of the voltage measurement circuit of FIG. 8.

FIG. 8 shows a possible implementation of the voltage measurement circuit (represented by (9) in FIG. 1). The measured voltage output is electrically isolated from the mains voltage with the use of a step-down transformer (42). The voltage across L1 and L2 (typically 240 VAC), is stepped-down to a lower voltage AC voltage with the use of the transformer (42), and then it is rectified with a full-wave rectifier (43). The interface circuitry (44) at the output of the full-wave rectifier is used to scale the output of the voltage into the measurement range of the analog to digital converter. This voltage (labeled $V_{measure}$ in FIG. 8) is then converted to a digital representation by the analog to digital converter and read by the load center processor. FIG. 10 shows examples of the waveform (51) that would typically be across L1 and L2, and the resulting waveform (52) at the input to the analog to digital converter, where $V_{max}$ in FIG. 10 is the maximum voltage that can be measured by the analog to digital converter. The load center processor samples the digital representation of the voltage read by the analog to digital converter at a frequency greater than four times the frequency of the AC mains voltage. The load center processor can then calculate the voltage across L1 and L2 by applying the scaling factors of the transformer (42) and the interface circuitry (44) and accounting for the full-wave rectification.

In an alternate embodiment, a neutral bus bar of the load center may be mounted on circuit board and arranged for connection to the neutral bus of branch circuit conductors found in branch circuits on sides of branch circuit loads opposite the circuit breakers. In such an embodiment, the voltage measurements may be taken between each hot bus bar and the neutral bar, as opposed to between the two hot bus bars (i.e. measuring between L1 and N, and between L2 and N, instead of between L1 and L2).

Figure 9:
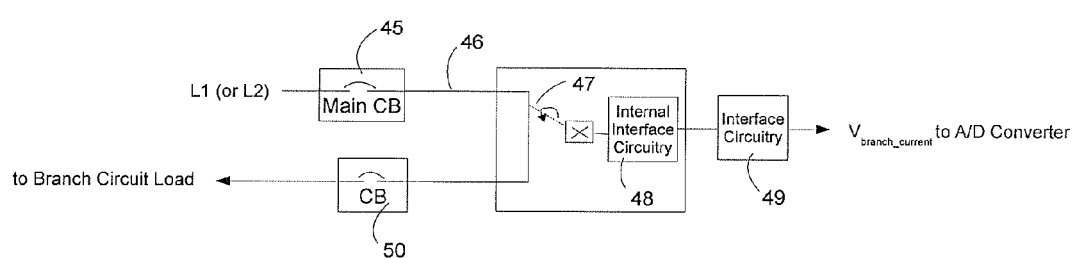
FIG. 9 is a schematic diagram of branch circuit current measurement circuitry of the load center of the present invention.

The branch circuit current sensors (as shown by (3) in FIG. 1) can be implemented with several different technologies. Some possibilities are transformers that output a small current relative to the output of the branch circuit. This current can then be converted to a voltage with a resistor network. However, the preferred solution of the branch circuit current measurement circuitry is shown in FIG. 9. FIG. 9 shows the connection of either L1 or L2 through the main circuit breaker (45) to the bus bar (46). The current sensor is implemented with an integrated circuit that measures current using the Hall-effect (47), where the strength of magnetic field produced by the branch circuit current flow is measured to determine the magnitude of the current. An example of a Hall-effect integrated circuit (IC) that could be used for the current sensor that is integrated into the bus bar is Allegro Microsystems part number ACS712. The Hall-effect current sensor allows the interface circuitry to be electrically isolated from the bus bar voltage.

An electrical connection is made through the current sensor to the branch circuit breaker (50). The interface circuitry internal to the current sensor (48) is used create an output voltage that is relative to the current supplied to the branch circuit load. The interface circuitry external to the current sensor (49) is then used to scale the voltage to appropriate range to be measured by the analog to digital converter. The load center processor can then calculate the branch circuit load current by applying conversion and scaling factors specific to the implementation of the interface circuitry. The load center processor samples the digital representation of each of the branch circuit current measurements at the same frequency that is used to sample the voltage across L1 and L2.

With both the voltage and the branch current measurements, the load center processor can make calculations to determine a variety of useful information. For example, the voltage and current measurements can be used to calculate the peak instantaneous voltage, peak instantaneous branch current, and the difference in phase of the voltage and current. These can then be used to determine the average power of the branch circuit load, the power factor of the branch circuit load, and the energy used in the load. This information can then be communicated using the communication interface to a user in a remote location. The price of energy can be included in the calculations, and the user can then see the cost of usage of energy in real-time, broken down to the branch circuit level.

The communication interface (6) shown in FIG. 1 can be implemented with many different types of communication interfaces, one option being an Ethernet controller and physical layer interface to allow an Ethernet network cable to be connected for communication to the internet. The load center processor can act as a web server itself, such that the desired power information can be viewed with a commonly available web browsing software, or the load center processor can pass the information using a proprietary protocol and use custom software programs on the computers and/or handheld devices to display the information.

The processor 5 and communication interface 6 are mounted on the same circuit board featuring the bus bar main and branch traces, the integrated circuit current sensors, the main and branch circuit breaker contacts and the voltage measuring circuit, thus providing a self-contained fully-functional assembly in a single pre-fabricated unit. Manufacture of a complete load center ready to install thus only requires the additional step of mounting this single unit within a suitably sized load center housing, which is easily achieved by simply mounting the circuit board to the housing interior, since all of the other components are already mounted, carried or otherwise defined on the circuit board itself. Installation of the load center is kept simple, requiring only mounting of the housing in a conventional manner, installation of commercially available circuit breakers in a conventional manner, connection of the incoming power lines in a conventional manner, and connection of branch circuits to the branch circuit breakers in a conventional manner. Furthermore, the layout of the various components can be selected to reflect the appearance of a conventional load center, as described herein above for the example of vertically stacked rows of two breakers each, in which the two breakers in each row connect to the same bus bar, and adjacent rows connect to opposing bus bars. Thus users or installers of the load center will not be intimated by an unfamiliar layout of breakers and connection points.

With a current sensor as the only electronic element between the main breaker and each branch circuit breaker that provides any function beyond completion of the electrically conductive path therebetween, branch-circuit controls or other more complex electronics are avoided, keeping the load center compact, easy to manufacture, and cost and material efficient, while still providing monitoring capabilities.

While the illustrated embodiments employ printed traces to form the hot power buses and employ integrated circuit current sensors (current sensor chips), other configurations are also contemplated that would still benefit from design as a substantial all-in-one prefabricated unit embodying bus-bars, circuit breaker contacts, pre-breaker sensors, and measurement processing devices. For example, the main run of the bus bar trace from which the branches or fingers extend may be a piece of bar fixed to the circuit board. The bar may be in conductive contact with branch traces incorporating the integrated circuit current sensors, or other current sensor types may be employed, for example at a wired connection from the bus bar to the respective circuit breaker contact site.

The use of directional terms such as vertical, horizontal, front, rear, back, upper, lower, top and bottom are used in the above description in the context of the orientation in which the load center would typically be mounted in a conventional manner, i.e. with the housing mounted to a wall in a vertical orientation placing a substantially closed rear wall of the housing against the wall, a front wall of the housing located at an open side of the housing facing away from the wall, and the circuit board mounted in the housing between the front and rear walls to position the circuit breakers in side-by-side vertical columns (i.e. vertical stacks of two-breaker rows). In a conventional manner, openings in the front wall can be employed to allow the circuit breaker toggles to be manipulated even with the front wall installed/closed to prevent inadvertent contact with live components inside the housing, while opening or removal of the front wall provides access to the interior components for service, upgrade, inspection, etc. The aforementioned directional terms are not intended to limit the present invention to installation in any particular orientation or position.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A load center comprising:
 a circuit board;
 two power buses carried on the circuit board and each arranged for conductive connection to a respective one of two incoming power lines intended to feed the load center;
 conductive paths branching away from each power bus in conductive connection therewith
 respective branch circuit breaker mounting sites defined on the circuit board and each conductively linked to a corresponding one of the two power buses by a respective one of the conductive paths, each branch circuit breaker mounting site being arranged to engagingly receive a branch circuit breaker in a position placing said circuit breaker in electrically conductive connection with the respective conductive path; and
 current sensors mounted on the circuit board, each in association with a respective one of the conductive paths branching off from the power buses to provide an output responsive to current passing through said respective conductive path from the corresponding one of the two power buses to the respective branch circuit breaker mounting site;
 wherein the conductive paths comprise conductive branch traces on the circuit board between the power buses and the branch circuit breaker mounting sites, and the branch circuit breaker mounting sites are arranged in rows comprising two circuit breakers each, the two circuit breakers of each row connecting to a same one of the two power buses via branch traces found among different layers on the circuit board.

2. The load center of claim 1 further comprising a processor mounted on the circuit board in communication with the current sensors to receive current level signals indicative of the current passing through the conductive paths.

3. The load center of claim 2 further comprising a communication interface located on the circuit board and linked with the processor to transmit data from the processor to remote locations external to the load center.

4. The load center of claim 1 wherein the current sensors comprise integrated circuit current sensors mounted on the circuit board in conductive connection between the power buses and the conductive branch traces.

5. The load center of claim 1 wherein each power bus comprises a respective power bus trace on the circuit board.

6. The load center of claim 1 further comprising a main circuit breaker mounting site on the circuit board, said main circuit breaker mounting site being arranged to engagingly receive a main circuit breaker in a position placing contacts of said circuit breaker in electrically conductive connection with the power buses.

7. The load center of claim 1 comprising a voltage sensor arranged to produce output responsive to a voltage level between the two incoming power lines to provide voltage level signals indicative of said voltage level to the processor.

8. The load center of 1 wherein the conductive branch traces include traces on opposing sides of the circuit board.

9. The load center of claim 1 wherein the branch circuit breaker mounting sites are all arranged to engage the branch circuit breakers on a same side of the circuit board, the respective conductive path of one circuit breaker in each row comprising a conductive trace extending along said row on the same side of the circuit board as on which the branch circuit breaker mounting sites are arranged to engage the branch circuit breakers, and the respective conductive path of the other circuit breaker in each row comprising another conductive trace extending along said row in a different layer of the circuit board.

10. The load center of claim 1 comprising a neutral bus carried on the circuit board and arranged for coupling thereof to an incoming neutral line associated with the two incoming power lines, and for connection to the neutral bus of branch circuit conductors found in branch circuits on sides of branch circuit loads opposite the circuit breakers.

11. A load center comprising a housing and, mounted within the housing as a single pre-fabricated unit of interconnected elements, two power buses, conductive paths branching away from each power bus in conductive connection therewith, respective branch circuit breaker mounting sites each conductively linked to a corresponding one of the two power buses by a respective one of the conductive paths, and current sensors each association with a respective one of the conductive paths branching off from the power buses to provide an output responsive to current passing through said respective conductive path between the corresponding one of the two power buses and the respective branch circuit breaker mounting site.

12. The load center of claim 11 wherein the pre-fabricated unit comprises a carrier mounted to the housing, and wherein the power buses, conductive paths, branch circuit breaker mounting sites, and current sensors are carried on the carrier.

13. The load center of claim 12 wherein the carrier comprises a single circuit board on which the power buses, conductive paths, branch circuit breaker mounting sites, and current sensors are carried.

* * * * *